(12) United States Patent
Spizig et al.

(10) Patent No.: US 12,252,113 B2
(45) Date of Patent: Mar. 18, 2025

(54) METHOD FOR A PROVISION OF IMAGE RECORDINGS

(71) Applicant: Robert Bosch GmbH, Stuttgart (DE)

(72) Inventors: Claus Spizig, Stuttgart (DE); Andreas Feder, Leonberg (DE); Bane Strahinjic, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 98 days.

(21) Appl. No.: 18/338,203

(22) Filed: Jun. 20, 2023

(65) Prior Publication Data
US 2024/0010188 A1 Jan. 11, 2024

(30) Foreign Application Priority Data

Jun. 24, 2022 (DE) ............... 10 2022 206 377.5

(51) Int. Cl.
| | | |
|---|---|---|
| *B60W 30/06* | (2006.01) | |
| *G06T 7/70* | (2017.01) | |
| *G06T 7/80* | (2017.01) | |
| *G06V 10/25* | (2022.01) | |
| *G06V 10/26* | (2022.01) | |
| *G06V 20/58* | (2022.01) | |

(52) U.S. Cl.
CPC ............... *B60W 30/06* (2013.01); *G06T 7/70* (2017.01); *G06T 7/80* (2017.01); *G06V 10/25* (2022.01); *G06V 10/26* (2022.01); *G06V 20/586* (2022.01); *B60W 2420/403* (2013.01); *G06T 2207/20081* (2013.01); *G06T 2207/30244* (2013.01); *G06T 2207/30264* (2013.01)

(58) Field of Classification Search
CPC .......... B60W 30/06; B60W 2420/403; B60W 50/00; B60W 2050/0043; B60W 2050/0045; G06T 7/70; G06T 7/80; G06T 2207/20081; G06T 2207/30244; G06T 2207/30264; G06V 10/25; G06V 10/26; G06V 20/586; G06V 20/56; H04N 19/46; H04N 5/92; H04N 5/917
See application file for complete search history.

(56) References Cited

U.S. PATENT DOCUMENTS

| | | | | |
|---|---|---|---|---|
| 7,834,905 B2 * | 11/2010 | Hahn | ............... | B60R 1/30 |
| | | | | 250/252.1 |
| 9,050,931 B2 * | 6/2015 | Yamamoto | ............... | B60R 1/27 |
| 11,592,832 B2 * | 2/2023 | Calleija | ............... | G08G 1/09623 |

(Continued)

*Primary Examiner* — Nay Tun
(74) *Attorney, Agent, or Firm* — NORTON ROSE FULBRIGHT US LLP; Gerard A. Messina

(57) ABSTRACT

A method for provision image recordings in a vehicle. The method include: ascertaining a first image recording of a first image sensor of the vehicle and at least one further image recording of at least one further image sensor of the vehicle; carrying out a merging of the first image recording and the at least one further image recording for a reduction of an amount of data for providing the relevant information, the merging taking place based on a selection from the surrounding regions, whereby at least one merged image recording is obtained; initiating at least one transmission of the merged image recording within the vehicle and at least to a central control device of the vehicle, whereby the merged image recording is supplied to a processing for performing the vehicle function.

13 Claims, 3 Drawing Sheets

(56) References Cited

U.S. PATENT DOCUMENTS

| | | | |
|---|---|---|---|
| 2010/0220190 A1* | 9/2010 | Hiroshi | B60R 1/27 |
| | | | 348/148 |
| 2013/0135444 A1* | 5/2013 | Stein | G08G 1/167 |
| | | | 348/148 |
| 2015/0165975 A1* | 6/2015 | Meadows | B60R 1/074 |
| | | | 701/49 |
| 2016/0165148 A1* | 6/2016 | Itoh | H04N 23/698 |
| | | | 348/148 |
| 2017/0297487 A1* | 10/2017 | Ali Khan | G08G 1/165 |
| 2017/0297489 A1* | 10/2017 | Fendt | H04N 7/181 |
| 2017/0345164 A1* | 11/2017 | Guerreiro | G06T 7/97 |
| 2018/0048801 A1* | 2/2018 | Kiser | G06V 20/58 |
| 2018/0107225 A1* | 4/2018 | Nguyen | G01C 11/02 |
| 2019/0356850 A1* | 11/2019 | Ashrafi | H04N 23/667 |
| 2021/0377437 A1* | 12/2021 | Ko | H04N 23/90 |

\* cited by examiner

METHOD FOR A PROVISION OF IMAGE RECORDINGS

FIELD

The present invention relates to a method for a provision of image recordings. Furthermore, the present invention relates to a computer program and to a device for this purpose.

BACKGROUND INFORMATION

Driver assistance systems, parking aids, and highly automated driving often use multiple cameras whose images are processed in the central control device of the vehicle. There are often overlapping regions or parts in the images acquired in this process that do not contain any additional information. Examples include reflections of the actual image of a camera on the hood, recording the sky, and the like. "Region of interest" (ROI for short) regions are typically used only in the control device, and, in the context of image processing, the remaining data are discarded if they are not used for the use of additional information. The use of additional information includes, for example, an estimation of the vehicle speed or calibration of the position of the cameras among themselves. Data that are unused later are thus transmitted anyway and cause an increase in bandwidth. Nevertheless, it is conventionally provided that gateways or zone controllers of the vehicle forward the data without knowledge of the image content in the vehicle network.

SUMMARY

An object of the present invention is to provide a method, a computer program, and an apparatus for providing image recordings. Features and details of the present invention are apparent from the disclosure herein. Features and details described in connection with the method according to the present invention of course also apply in connection with the computer program according to the present invention as well as the device according to the present invention, and vice versa in each case, so that with regard to the disclosure of the individual aspects of the present invention, mutual reference is or can always be made.

In particular, a method according to the present invention is used to provide image recordings in a vehicle. The vehicle can be for example a motor vehicle and/or an autonomously driving vehicle and/or a truck and/or a passenger vehicle. The image records are in particular data representing at least one image or a sequence of images.

In particular, according to an example embodiment of the present invention, the following steps are carried out automatically, preferably one after the other in the indicated sequence, and the steps can also be carried out repeatedly if necessary:

ascertaining a first image recording of a first image sensor of the vehicle and at least one further image recording of at least one further (e.g. second, third, fourth, etc.) image sensor of the vehicle, for example by receiving the image recordings from the image sensors, it being possible for different spatial regions of a surrounding environment of the vehicle to be imaged by the image recordings, as a result of which at least one item of information relevant to a vehicle function of the vehicle is provided, carrying out a merging of the first image recording and the at least one further image recording for a reduction of a data amount for providing the relevant information, wherein the merging may be carried out based on a selection from the surrounding regions, whereby at least one merged image recording is obtained, initiating and/or carrying out at least one transmission of the merged image recording (at least) within the vehicle and/or at least to a central control device of the vehicle, whereby the merged image recording is supplied to processing for performing the vehicle function.

In particular, a feature of the present invention is that the reduction of the amount of data required to provide the relevant information is upstream of the further processing of the image recordings. To reduce the amount of data, for example a region of interest (ROI for short) of the image recordings is defined and selected from the image recordings, i.e., in particular cropped from them. This step is conventionally carried out by the central control device only during the subsequent processing for performing the vehicle function, in particular image processing, but can be separated from it according to the present invention.

According to an example embodiment of the present invention, during the ascertaining of the image recordings, in addition to the first image recording, the other image recordings, e.g. at least a second image recording, third image recording, etc., can also be ascertained. The image recordings may here have been acquired temporally in parallel by the different image sensors. The image sensors can be situated at different positions on the vehicle for this purpose. Accordingly, different spatial regions of the surrounding environment of the vehicle can be imaged (e.g. optically and/or visually) by the image recordings; here the environmental regions may partially overlap and/or contain redundant information. For example, a first image sensor may be oriented in the direction of travel (towards the front), and/or a second image sensor may be oriented in a direction opposite the direction of travel, and/or a third image sensor may be oriented to a left blind spot, and/or a fourth image sensor may be oriented to a right blind spot.

The at least one relevant item of information can include, for example, at least one of the following items of information:

an item of speed information about a speed of the vehicle,
an item of object information about at least one object in the environment of the vehicle, e.g. at least one vehicle traveling in front,
an item of distance information about a distance to a vehicle traveling in front.

The at least one vehicle function includes, for example, a driver assistance system and/or a parking assistant and/or highly automated driving. The image sensor can be a camera, and in particular a stereo camera. The image sensor can also be another device for acquiring the surrounding environment, such as a radar sensor or the like. Accordingly, the image recordings can each be realized as at least two-dimensional or three-dimensional image data.

According to an example embodiment of the present invention, carrying out the merging can involve a combination of those image recordings that were taken temporally in parallel, and thus at substantially the same point in time. The combination may be understood such that redundant and/or overlapping regions of the image recordings are at least partially removed. Advantageously, the image recordings depict, at least in part, different regions of the vehicle's surrounding environment that contain the relevant information and can therefore be put together like a puzzle. Overlapping and/or redundant regions can be discarded, whereby a selection is made from the surrounding regions of the environment, so that a reduction in the amount of data in order to provide the same relevant information is possible. Furthermore, the selection from the surrounding regions can also be understood to mean that only those regions of the image recordings are merged that depict regions of the environment that contain the relevant information. This thus corresponds to a restriction of the image recordings to a region of interest. According to a concrete example, for example, portions of the image recordings can be removed which are already imaged by another of the image recordings (overlapping regions), and other portions can be removed which are not evaluated in the context of the processing and are therefore not relevant (e.g. a sky or a hood).

The at least one processing for performing the vehicle function may include, for example, an image processing in which the restriction to a region of interest is also standardly carried out. According to the present invention, this restriction can already be carried out before the transmission to the central control device and supplying to the at least one processing, in order in this way to reduce the amount of data to be transmitted.

In addition, in the context of the present invention it can be provided that for the selection from the surrounding regions, the following step is carried out:
  removal of at least one region of the image recordings that redundantly images a portion of the environment and/or an overlapping region of the environment.

When multiple image sensors, in particular cameras, are used for the vehicle function, the resulting image recordings usually contain redundant and possibly even overlapping regions that do not contain any additional information. This can be, for example, the hood, which shows reflections of the actual image, or a recorded sky and the like. Usually, such regions are discarded in the central control device if they are not used to ascertain additional information. In contrast, it can be an advantage of the present invention that such regions can be removed prior to transmission to the central control device. This can reduce the effort and amount of data required in the data transmission and processing, in particular beyond a level achievable by data compression.

According to an example embodiment of the present invention, the removed at least one region of one of the image recordings can here redundantly image such a portion of the environment and/or an overlapping region of the environment that is already imaged by another region of the same image recording. The image recording of one (individual) image sensor would thereby be inherently redundant and/or overlapping. Also, it can be provided that the removed at least one region of the first image recordings redundantly images such a portion of the environment and/or an overlapping environment region that is already imaged by another region of one of the at least one further image recordings. Thus, the image recording of one of the image sensors would be redundant and/or overlapping only in combination with one of the further image recording of another of the image sensors. In both cases, the merging according to the present invention can reduce the amount of data and still provide the same relevant information.

According to an example embodiment of the present invention, in a further option, it can be provided that for the selection from the surrounding regions, the following step is carried out:
  removing at least one region of the image recordings which is not part of the relevant information.

This removed region can include the portion of the image recordings that is not part of the region of interest, i.e. a region of the image recordings outside of the region of interest. Here this region can be a function of the position and orientation of the image sensors on the vehicle. For example, the region of the image recordings that depicts the sky may not contribute to the relevant information and can therefore be removed.

Optionally, it may be provided that the selection from the surrounding regions is carried out based on at least one item of position information about a position and/or orientation of the image sensors on the vehicle, the position information being ascertained by at least one of the following steps:
  evaluating at least one predefined item of information about the position of the image sensors on the vehicle,
  carrying out a calibration of the position information, in particular by a trained algorithm.

In particular, it is a feature of an example embodiment of the present invention that based on the knowledge about the installation of the sensors in the vehicle, the step of forming the region of interest can be separated from the subsequent processing. A use of trained algorithms for calibration tracking is also possible here. The merging of the image recordings is in particular possible due to the knowledge of the mechanical construction and/or the orientation and/or a tracking of the calibration, e.g. via an artificial intelligence algorithm (e.g. trained Convolutional Neural Networks, or CNNs). Examples of such algorithms are "Gaffe" or "TensorFlow." The predefined information can be pre-stored in the vehicle, for example in a non-volatile data memory.

According to an example embodiment of the present invention, it may further be provided that carrying out the merging includes selecting at least one region of interest of the image recordings, wherein the region of interest is or may be defined by the vehicle function, optionally excluding regions of the image recordings outside the region of interest from the merging and/or transmission. In other words, the region of interest can be cropped from the image recordings to form the merged image recording therefrom. The region of interest can be defined by the vehicle function, and different vehicle functions may also define different regions-of-interest. For example, some vehicle functions define a surrounding region in the direction of travel as a region of interest, whereas other vehicle functions require the surrounding regions in further vehicle directions.

In addition, in the context of the present invention it can be provided that the carrying out of the merging includes the following step:
  incorporating an item of metadata information into the merged image record defining at least one region of the image recordings that is excluded from a transmission.

The inclusion of specific metadata information in the sensor information makes it possible for individual regions of the image recordings to be excluded from transmission at a later time, without the image content of the image recordings themselves then having to be processed again. Instead, downstream transmission points (e.g. a control device or gateways) can simply evaluate the metadata information for this purpose in order to determine which regions to exclude. In other words, the metadata information can be used to indicate what is located where in the merged image recording.

According to an example embodiment of the present invention, it is also optionally possible that selection information is defined and transmitted by the central control device, preferably on the basis of at least one reference marker, and in particular received by a zone controller, in order to carry out the merging as a function of the selection information, and in particular in order to adjust the region of interest. In this way a return channel from the central control device is provided through which it is possible to communicate which regions or portions of the image recording are not used in the further processing, so that they can no longer be transmitted. The selection information thus forms "feedback" from the control device or processing to the zone controller in order to track the merging and/or region of interest. The at least one reference marker in the image recordings can be used here as orientation for the control device. Thus, the region of interest or the calibration can also be adjusted during running operation, if necessary. The reference marker is, for example, a marker that indicates a specific position in the image recording relative to a known position on the vehicle. Also, if necessary, the reference marker can indicate a scale of the image recordings.

According to an example embodiment of the present invention, it is further optionally provided that the at least one piece of information relevant to the vehicle function of the vehicle includes an acquisition value, and that carrying out the merging includes at least one of the following steps:

evaluating at least one acquisition region of the image recordings to determine therefrom the acquisition value, in particular a speed of the vehicle, the acquisition region preferably being different from a region of interest, incorporating additional information into the merged image recording, the additional information including the detection value, excluding the acquisition region from the merged image recording and/or transmission.

A further feature of an example embodiment of the present invention is in particular that the additional information, e.g. about a vehicle speed or a calibration, can be transmitted as a scalar quantity instead of via redundant data. The additional information can thus include a scalar quantity, which for example indicates the ascertained detection value for the vehicle speed or another parameter. The evaluation can thus also be realized as a measurement, and the acquisition value can be realized as a measured value. Usually, such a measurement takes place downstream, for example in the central control device, on the basis of the image recordings. For example, the speed can be ascertained by evaluating objects imaged by the image recordings having a fixed distance from each other, in particular in the course of time. If this evaluation takes place before transmission to the central control device, only the acquisition value has to be transmitted, but not the acquisition region used for evaluation. Thus, the amount of data to be transferred can be significantly reduced. The acquisition region is, for example, a two-dimensional region of the image recordings or also a sequence of images of this region.

According to an advantageous further development of the present invention, it can be provided that the merging is carried out decentrally by a zone controller, such that preferably after the ascertaining of the image recordings, the image recordings are transmitted to the zone controller, the transmission of the merged image recording to the central control device preferably being carried out via a transmission system, in particular bus system, of the vehicle.

The bus system can be, for example, a CAN bus or a vehicle network such as an Ethernet.

According to an example embodiment of the present invention, it may in addition be possible for lossy data compression of the image recordings and/or of the merged image recording to be carried out, where the lossy data compression can include the following steps:

carrying out a preparation of the respective image recording, in which a portion of the image recording, in particular a first data portion, is removed and an artificially generated and reproducible replacement portion is defined as an approximation of the removed portion by a replacement item of information in order to prepare the image recording for a lossless data compression, carrying out the lossless data compression of the prepared image recording, such that preferably during the respective transmission of the image recordings the replacement information is transmitted instead of the removed portion. Here, the removed portion and the replacement portion can each be understood as a portion of the image recordings, which may represent a portion of each pixel. For example, the portion is a noise portion. In contrast, a region, such as the region of interest, cannot be understood as a portion of individual pixels but rather a selection of multiple and possibly contiguous pixels. In particular, here synergies can be achieved by combining carrying out merging according to the present invention, preferably the formation of an ROI, with an efficient data compression. For example, in the zone controller, both the removal of the first data portion and the removal of regions outside the ROI can be done in a single step.

In addition, the described data compression yields the advantage that more, and more relevant, data can be transmitted, even if the data connection used for this purpose is only a connection having lower bandwidth. The data can here be compressed to a much higher degree than is possible with many conventional methods. At the same time, falsification of the data can be avoided, since the first data portion is not merely removed, but rather a replacement portion is additionally provided as an approximation of the removed portion.

According to an example embodiment of the present invention, the replacement portion can be artificially generated and/or reproducible. This means that the replacement portion is not obtained from a modification or alteration of the removed portion, but can be generated completely artificially even without knowledge of the removed portion, using the replacement information. For this purpose, a generator such as a random number generator is used, which can generate the replacement portion, e.g. as a matrix or vector of random numbers, on the basis of the replacement information, such as a seed. This has the advantage that the replacement portion itself does not have to be transmitted, but only the replacement information. The replacement information can here be only a key, such as a seed key, and can thus have a much smaller data size of a few bits compared to the replacement portion and the removed portion. For example, the replacement information has max. 1% of the data size of the replacement portion and/or the removed portion.

According to an example embodiment of the present invention, the image recordings can be transmitted as data within the vehicle. Data compression has the advantage that the amount of data to be transmitted can be reduced. In the following, the image recordings are therefore also referred to simply as data, for a more detailed description of the data compression.

Further, within the scope of the present invention, it is possible that the removed portion is a noise portion of the data and/or the replacement portion is an artificially generated noise, in particular a pseudo-noise. The removed portion can be a particular portion of the data, which can be characterized and selected according to predefined and, in particular, statistical criteria. When the first data portion is removed, the prepared data may include only the portion of the data remaining after the removal. (In the context of the present invention, the removed portion is also referred to as the first data portion, and the remaining portion as the second data portion.) The remaining portion can have the relevant information content, e.g. a recording of an environment of the vehicle. In contrast, the removed portion can have a lower and predominantly random information content, e.g. as noise representing merely statistically distributed energy.

It can be provided within the scope of an example embodiment of the present invention that the data compressed by the lossless data compression as well as the replacement portion are reproduced in bit-identical fashion on the basis of the replacement information after the transmission. However, in combination with the preparation, a lossy data compression of the data may still result, because here the data portion is removed and the lossless data compression is applied only to the remaining portion of the data. "Bit-identical" means in particular that each bit of the data can be reproduced identically and thus without loss.

It is possible that through a removal of the first data portion, in particular the noise portion, of the data, a much higher compression can be achieved than would be the case with conventional methods. Since the removed data portion can have a rather random and statistically distributed information content, only an inefficient compression would be possible. Due to the predominantly random content of the removed portion, this portion can be statistically approximated instead, thus enabling a substitution by the artificially generated replacement portion. In contrast, the data portion remaining after the removal cannot be statistically replicated due to the predominantly non-random information content, but can nevertheless be better compressed due to the extensive redundant information. In other words, the determined data may consist of a random first data portion, especially noise, and a second data portion with a high proportion of redundant information. If the data are in the form of image data, the first data portion can be the (superimposed) noise portion of the image, and the second data portion can be the remaining portion of the image after subtracting the noise. This can also hold for each pixel of the image; this can be made up of the first (random, noise) and second (redundant) data portion. The in particular lossless data compression can be applied to the second (redundant) data portion. The first data portion, on the other hand, can be replaced by the replacement portion, in particular based on a noise model. Since the replacement portion does not have to be transmitted, but can be reproduced bit-identically using the replacement information, the data size to be transmitted is reduced. Although the replacement portion (only) approximately corresponds to the first data portion, the original data portion is irretrievably lost, so that this procedure can also be understood as lossy data compression. In other words, this lossy data compression for the first data portion is combined with the lossless data compression for the second data portion. This allows a compressed quantity of data to be transmitted.

Since the first data portion is removed, and moreover is not reproducible, the method according to an example embodiment of the present invention may include a lossy data compression, in which the first data portion is lost but the remaining second data portion may be compressed losslessly. To avoid falsification of the data, a replacement portion can be generated instead of the first data portion. After transmission, the replacement portion can be reproduced without loss, in particular bit-identically, and reimpressed on the transmitted data. For example, a reproducible pseudo-noise can be used as the replacement portion. Here, although the replacement portion does not replace the removed data portion bit-identically, it does come very close to it. Through this impressing of reproducible pseudo-noise, a strong compression factor can be achieved. The remaining portion of the data as well as the replacement portion can be reproduced bit-identically after the transmission. If the removed first data portion is a noise portion of the data, replacing the noise portion with the replacement portion can also be referred to as a noise substitution. Noise substitution allows the greatest portion of the random noise in the data, which can be characterized by an input noise model, to be replaced by the pseudo-noise, which is characterized by a target noise model.

In addition, it is possible within the scope of an example embodiment of the present invention for the replacement portion to be defined by specifying the replacement information, in particular a seed key for a generator such as a random number generator, the replacement portion preferably being subsequently reproduced by the replacement information, in particular after the transmission of the data. The replacement information thus unambiguously defines the replacement portion, e.g. the pseudo-noise, so that the replacement portion can be reproduced bit-identically on the basis of the replacement information. For this purpose, for example the replacement information is used by a generator, or random number generator, to generate the replacement portion in the form of a two-dimensional matrix. The seed key can be determined, for example, by measuring the noise characteristic of the (real) image sensor. The statistical characteristic of this pseudo-noise thus corresponds to that which really occurred in the image sensor, but is bit-identically reproducible.

Furthermore, it is possible within the scope of an example embodiment of the present invention that carrying out the preparation includes at least one of the following steps:
 incorporating at least one piece of additional information into the image recording, which preferably includes an acquisition value,
 incorporating metadata information into the image recording,
 incorporating at least one reference point, in particular reference marker, which is designed to determine a position of the image sensors and/or the positions of the image sensors relative to one another.

Thus, for example, a use of a lossy data compression is provided in which in addition at least one reference point can be embedded in the image recording in order to enable, via the reference point, efficient determination of the position of the image sensors relative to one another. The at least one reference point, preferably a plurality of reference points, can here be specific to the position and/or orientation of the image sensors, and in particular can also be used to calibrate the position information.

The subject matter of the present invention also includes a computer program, in particular a computer program product, having instructions that, when the computer program is executed by a computer, cause the computer to carry out the method according to the present invention. Thus, the computer program according to the present invention provides the same advantages as described in detail above in relation to a method according to the present invention.

The subject matter of the present invention also includes a device for data processing. As the computer, for example the data processing device that executes the computer program and/or the method according to the present invention can be provided. The device and preferably the computer can include at least one processor for executing the computer program. Also, a non-volatile data memory can be provided in which the computer program can be stored and from which the computer program can be read out by the processor for execution. The device according to the present invention can also have multiple processors and/or be designed as a computer system. For example, the device according to the present invention can include a central control device of the vehicle and/or one or more decentralized zone controllers of the vehicle. Also, the device according to the present invention can optionally designate the entire vehicle electronics.

The subject matter of the present invention can also be a computer-readable storage medium having the computer program according to the present invention. The storage medium is designed, for example, as a data storage device such as a hard disk and/or a non-volatile memory and/or a memory card. The storage medium can be integrated into the computer, for example.

Furthermore, the method according to the present invention can also be realized as a computer-implemented method.

Further advantages, features, and details of the present invention result from the following description, in which exemplary embodiments of the present invention are described in detail with reference to the figures. The features mentioned in the description can be essential to the present invention individually or in any combination.

DETAILED DESCRIPTION OF EXAMPLE EMBODIMENTS

In the following figures, identical reference signs are used for the same technical features even of different exemplary embodiments.

Figure 1:
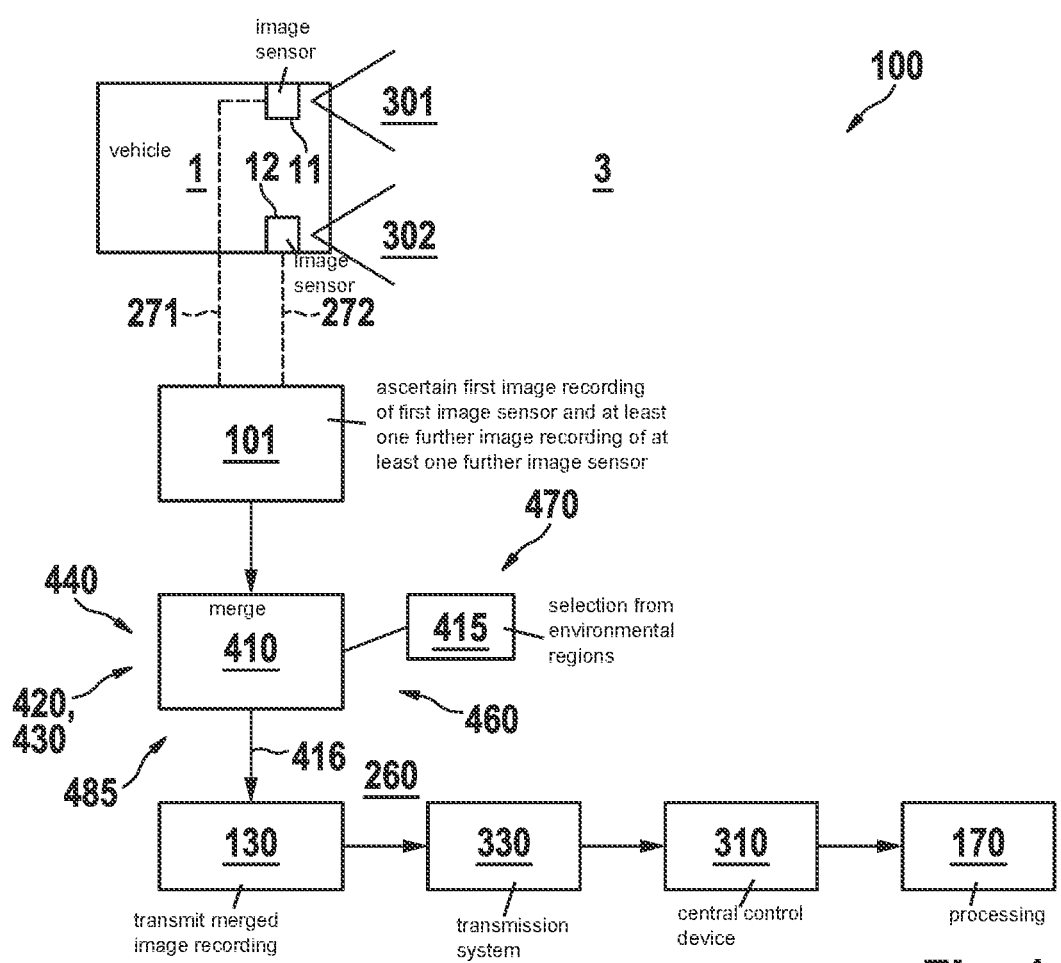
FIG. 1 shows a visualization of the steps of a method according to an example embodiment of the present invention.

FIG. 1 schematically illustrates the steps of a method 100 according to the present invention. The method is used here for a provision of image recordings 271, 272 in a vehicle 1, the image recordings preferably being acquired by a plurality of image sensors 11, 12. The image sensors 11, 12 are in particular cameras, and thus imagers each with a chip with defined resolution, frame rate, and noise characteristics. A first image sensor 11 and a second image sensor 12 on vehicle 1 are shown as examples. According to their configuration and orientation, image sensors 11, 12 can detect different spatial environmental regions 301, 302 in a surrounding environment 3 of the vehicle 1.

According to a first method step, an ascertaining 101 of a first image recording 271 of the first image sensor 11 of the vehicle 1 and at least one further image recording 272 of at least one further image sensor 12 of the vehicle 1 takes place. Corresponding to the configuration and orientation of the image sensors 11, 12, the different surrounding spatial environmental regions 301, 302 can be imaged by the image recordings 271, 272. This imaging is necessary in order to provide at least one item of information relevant to a vehicle function of vehicle 1. For example, the image recordings 271, 272 can be used for detection of objects in the environment 3 by a driver assistance system.

To improve a transmission 130 of the relevant information within vehicle 1, a merging 410 of the first image recording 271 and the at least one further image recording 272 is then carried out. This can achieve a reduction of a data volume for the provision of the relevant information. Here the merging 410 can take place based on a selection 415 from the environmental regions 301, 302, whereby at least one merged image recording 416 is obtained. For example, the selection 415 is carried out based on a predefined region of interest 460, which may be defined as a function of the vehicle function.

Subsequently, the at least one transmission 130 of the merged image recording 416 can be initiated within vehicle 1. The merged image recording 416 is transmitted to, for example, a central control device 310 of the vehicle 1, whereby the merged image recording 416 can be supplied to a processing 170 for performing the vehicle function. The central control device 310 can for example carry out the vehicle function through the processing 170.

Figure 2:
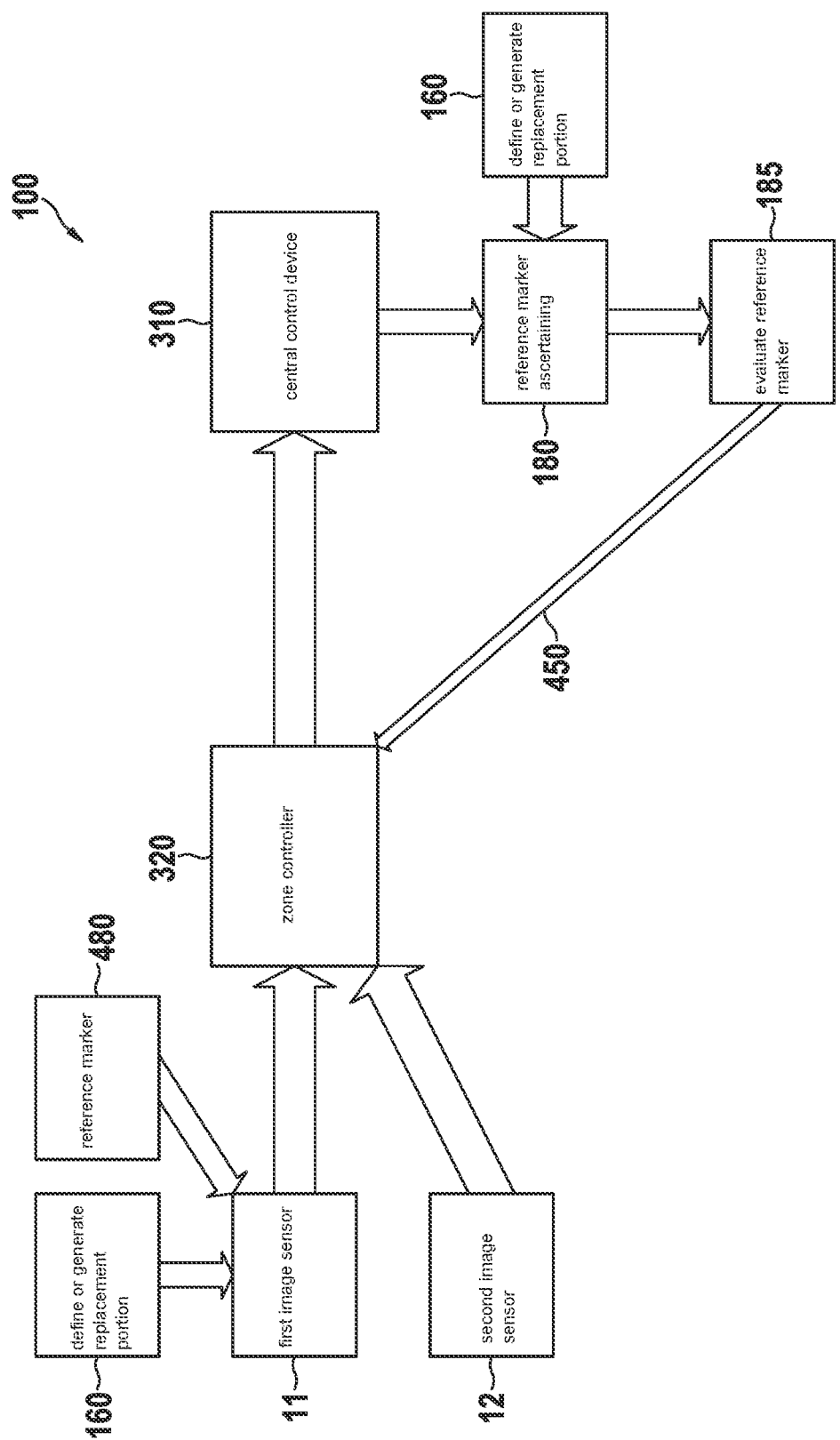
FIG. 2 shows a further visualization of the steps of a method according to an example embodiment of the present invention.

In addition, according to FIG. 1, the merging 410 can be carried out in a decentralized manner by a zone controller 320 visualized in FIG. 2, the image recordings 271, 272 preferably being transmitted to zone controller 320 after the ascertaining 101 of the image recordings 271, 272. Preferably, the transmission 130 of merged image recording 416 to central control device 310 can be carried out via a transmission system 330, in particular a bus system, of vehicle 1. In addition, the at least one item of information relevant for the vehicle function of vehicle 1 can include an acquisition value 420, and the carrying out of the merging 410 can include the following steps:

evaluating at least one acquisition region 430 of the image recordings 271, 272 to determine therefrom the acquisition value 420, in particular a speed of the vehicle 1, incorporating an item of additional information 260 that includes the acquisition value 420 into the merged image recording 416, excluding the acquisition region 430 from the merged image recording 416 and/or the transmission 130.

The selection 415 from the surrounding regions 301, 302 can in addition be carried out based on at least one item of position information 470 about a position and/or orientation of the image sensors 11, 12 on vehicle 1, the position information 470 being ascertained by at least one of the following steps:

evaluating at least one predefined item of information about the position of the image sensors 11, 12 on vehicle 1, carrying out a calibration of the position information 470.

FIG. 2 further illustrates that an item of selection information 450 is defined and transmitted by the central control device 310 based on at least one reference marker 480, and in particular received by a zone controller 320 in order to perform the merging 410 as a function of the selection information 450.

The zone controller 320 can be designed to bundle the image recordings 271, 272 and possibly further data from additional image sensors 11, 12 and to transmit them further to central control device 310. Therefore, the reduction of the image recordings 271, 272 visualized in FIG. 1 can be done by zone controller 320. In particular, for this purpose, in the carrying out of the merging 410 according to FIG. 1, redundant data of the image recordings 271, 272 is removed and implicitly contained information such as speed of vehicle 1 is extracted as acquisition value 420 and explicitly added to merged image recording 416. A transmission with a smaller amount of data is thus possible. The reference marker 480 visualized in FIG. 2 and the metadata information 440 visualized in FIG. 1 can be used to obtain information which of the data from image recordings 271, 272 is to be used in the subsequent processing 170.

Carrying out the preparation 110 may further include, according to FIG. 1, incorporating at least one item of additional information 260 into the image recording 271, 272, such that the additional information 260 can include a detection value 420. In addition, an incorporation of metadata information 440 into the image recording 271, 272 can be provided. Moreover, it is possible for an incorporation to take place of at least one reference point 485 that is designed to determine a position of the image sensors 10 and/or the positions of the image sensors relative to one another. This reference point 485, preferably a plurality of reference points 485, can be directly embedded in the image recordings 271, 272. In this way, the amount of data to be transmitted can be readjusted.

FIG. 2 shows that a reference marker ascertaining can take place at 180. Here, in particular in combination with a data decompression, reference marker 480 is extracted from image recordings 271, 272. At 185, an evaluation of the reference marker 480 can subsequently take place to determine, for example, further information, such as an exact position of the imaged surrounding region 301, 302, from the image recordings 271, 272.

Figure 3:
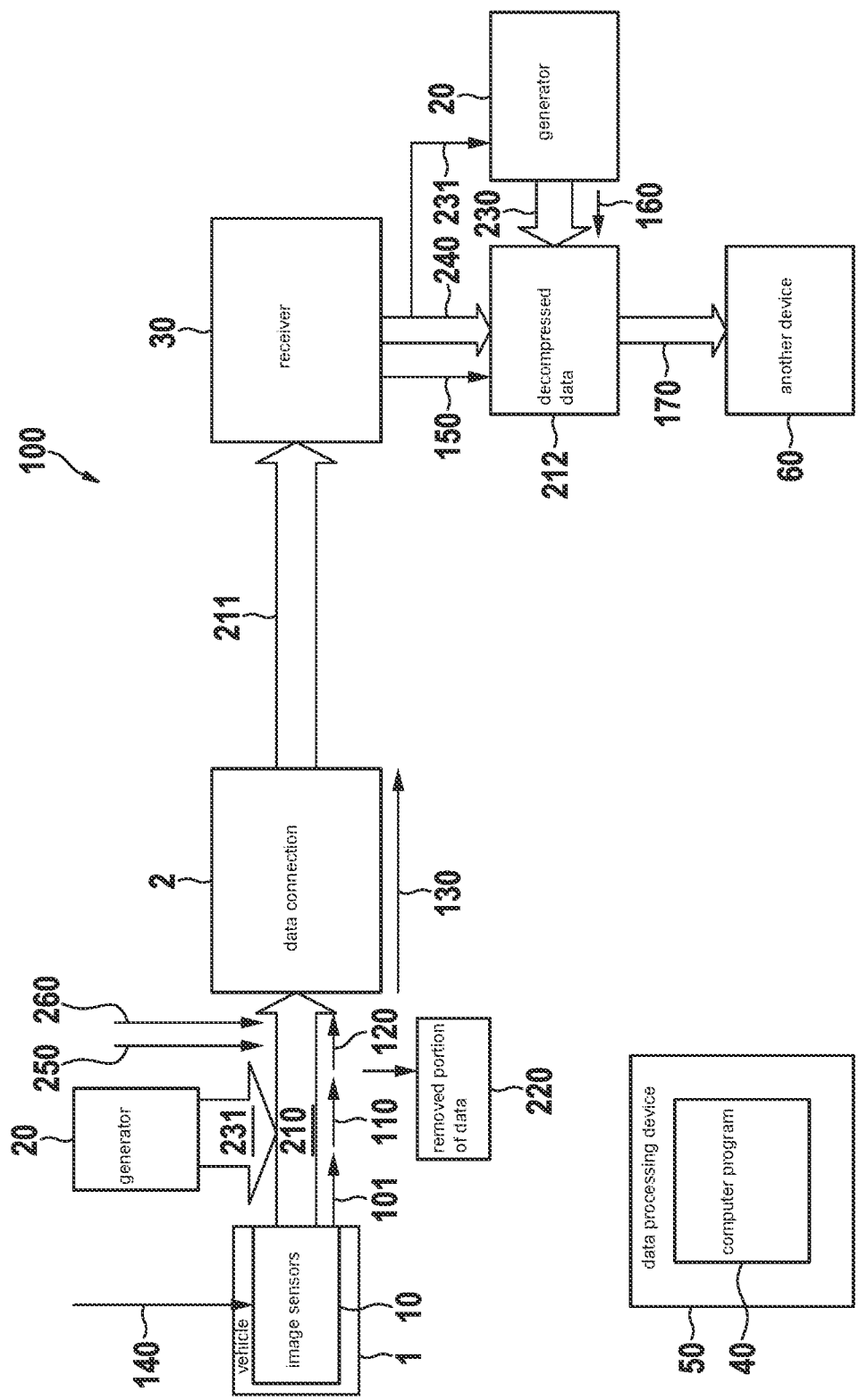
FIG. 3 shows a visualization of the steps of a method according to an example embodiment of the present invention with further details.

FIG. 3 visualizes further optional steps of a method 100 according to the present invention for a provision of data 210, i.e. image recordings 271, 272. As an example, an image sensor is shown that can include a chip with defined resolution, frame rate, and noise characteristics. In FIG. 3, image sensor also stands in representative fashion for a plurality of image sensors 11, 12. Digital images ascertained by such image sensors 10 typically contain a high degree of entropy, due in large part to sensor noise. The presence of this noise is an important aspect of what gives the image its natural statistical properties. A removal of this noise can cause processing algorithms applied to the images, e.g. in the context of a further processing 170, to provide different results than for an image that still contains this noise. Data 210 would thus be falsified. However, the presence of the noise strongly limits the data reduction achievable by a lossless compression.

In the following, it is described in more detail how higher compression rates can be achieved through the use of a replacement portion 230 while at the same time maintaining a realistic noise profile, so that content falsification can be avoided.

Image sensors 10 can be part of vehicle 1 and can perform an acquisition 140 in an environment 3 of vehicle 1 or at vehicle 1 itself. Data 210 can be ascertained based on the acquisition 140 and can be for example sensor data outputted by image sensors i.e. image recordings 271, 272 described above. Acquisition 140 can include a recording of content relevant to the vehicle function, in particular of objects in the surrounding environment 3 of vehicle 1. It can further be possible to carry out a vehicle function through a processing 170 of the data 210.

According to a first method step, the ascertaining 101 of the data 210 is carried out at the vehicle 1. The data can be temporarily stored, for example, after the acquisition 140, in order to transmit it at a later time when a data connection 2 is available. For this purpose, it can be possible to repeatedly detect whether data connection 2 is available in order to then initiate the process steps. For the transmission 130, a preparation 110 of the ascertained data 210 can be carried out, in which a portion 220 of the data 210 is removed and an artificially generated and reproducible replacement portion 230 is defined, as an approximation of the removed portion 220, by an item of replacement information 231, in order to prepare the data 210 for an in particular lossless data compression 120. Here, after removing portion 220, data 210 may still include a remaining portion 240 that is particularly suitable for the lossless data compression 120. The removed portion 220 may also be referred to as the first data portion 220 and the remaining portion 240 may be referred to as second data portion 240.

The step of preparing 110 can be carried out at least in part by a generator 20. Further, in this step an addition of further information to the data 210 can optionally take place, for example an item of additional information 260 and/or a watermark 250. Subsequently, data compression 120 of the prepared data 210 can be carried out and transmission 130 of the data 211 compressed by the data compression 120 can be initiated and/or carried out via the data connection 2. Here the removed portion 220 is not transmitted; rather, instead of portion 220, replacement information 231 is transmitted together with the remaining portion 240. Here, removed portion 220 can be a noise portion 220 of the data 210 and replacement portion 230 can be an artificially generated noise 230, in particular a pseudo-noise 230.

The replacement portion 230 can be defined during the preparation 110 by defining the item of replacement information 231, in particular a seed key for the generator 20 or for a random number generator 20. It is then possible to use the replacement information 231 to generate and thus reproduce the replacement portion 230, in particular after transmission 130 and decompression 150 of the data 210. For the definition and/or generation 160 of the replacement portion 230, it can also be provided that the replacement portion 230 is generated in the form of a pseudo-noise 230 by an application of the generator 20. To enable a bit-identical reproduction of the replacement portion 230, the generator 20 can be carried out with defined initial conditions, in particular as a function of a target noise model, referred to as a noise model for short. The initial conditions may be specified and transmitted by the item of replacement information 231.

In addition, FIG. 3 shows a computer program 40 according to the present invention for carrying out the method steps, and a data processing device 50 according to the present invention.

The removal of portion 220 can include removing most of the noise from the data 210, in particular the image data 210, for example by noise reduction. If necessary, corrections can also be made here, such as of sensor-specific noise, noise due to fixed patterns, or non-uniform photosensitivity. After this step, the prepared data 210 are obtained, which can also be referred to as noise-reduced data 210.

Optionally, the generated pseudo-noise 230 can be added to the noise-reduced data 210, particularly image data 210, at a later time, such that the resulting pseudo-noise image accurately mimics the desired noise model. The desired noise model can be suitable to mimic the relevant image sensor 10.

The prepared data 210 can be compressed and transmitted without loss. In this context, the data 210 can optionally include, in addition to a data content, the noise model with the at least one corresponding parameter (i.e. in particular replacement information 231, or the seed key), and preferably metadata and/or further additional information 260. The at least one parameter can be stored, e.g. using a steganographic key, in the data 210 itself or in further data or in a separate file. Lossless compression can take place for example by a factor of 5 to 10, preferably using a lossless codec defined in the JPEG2000 standard or a user-defined lossless codec. Examples are lossless JPEG or PNG compression, or also a ZIP compression. The at least one parameter of the pseudo-noise can optionally be stored along with the compressed data 210. The decompression 150 can take place by first decompressing the data 210 using the same lossless codec, and then generating the pseudo-noise based on the at least one parameter and adding it to the data 210.

In the following, an exemplary embodiment of the method steps according to the present invention are described in more detail. Here the ascertained data 210 can be in the form of image data 210 that have a plurality of pixels i with the respective values $x_i$ have. Here each pixel i can have the first data portion 220, i.e. the noise portion 220, and the remaining second data portion 240 having partly redundant information. This means that the two data portions 220, 240 can overlap. The removal of first data portion 220 as part of the preparation 110 of data 210 can take place for example by noise reduction. Conventional noise reduction techniques can be used for noise reduction. A noise model is usually used for this purpose. The prepared data 210 can then still include only the remaining portion 240 and the thus noise-reduced data 210. For example, a Poisson-Gaussian model can be used as a noise model, for which the estimated standard deviation $\sigma_i$ of the pixel i with the value $x_i$ is given by $\sigma_i = \sqrt{a(x_i - x_0) + b}$. Here the noise parameters for this model are a. These correlate in particular with the signal amplification in image sensor 10. The black level of image sensor 10 can be specified by $x_0$. Furthermore, b can denote a parameter related to the read-out noise of image sensor 10. While this noise model is preferably suitable for CCD and CMOS raw image data, a simplified model can also be used in which it is assumed that the noise has a standard deviation $\sigma_0$ which is independent of the pixel value. In this case, the number of noise bits per pixel i for image data 210 can be calculated with integer values, as $N_{Bits} = \log_2(\sigma_0 \sqrt{12}) = \log_2(\sigma_0) + 1,792$. This number can be e.g. 6 to 8 bits. Using the noise reduction techniques, it is then possible to ascertain, for the respective values $x_i$ of the pixels i, a noise-reduced value $y_i$. For example, a pseudo-random number generator 20 with a seed S is used for this purpose, where S can be an integer, in order to generate for each pixel i a pseudo-random number $R_i$. The noise-reduced pixel values $y_i$ of the noise-reduced data 210 can be calculated, as an example, by:

$$y_i = \text{round}\left(\frac{x_i}{\frac{\sigma_0}{q}} + R_i\right).$$

In the generation of the noise-reduced data 210 using the noise reduction techniques, first data portion 220 is removed. Accordingly, first data portion 220 can designate the difference between the originally ascertained data 210 and the prepared noise-reduced data 210. Here first data portion 220 can include most of the natural noise in the ascertained data 210.

After the removal of portion 220, the replacement portion 230 can be defined. Replacement portion 230 can be a pseudo-noise 230, which should be as close as possible to the removed noise. Replacement portion 230 can be generated based on replacement information 23, in the present example a seed key. A target noise model can be used for this purpose. In the simplest case, the seed key can be arbitrarily predefined for this target noise model and can be fixedly stored for the method according to the present invention. Thus, defining replacement portion 230 does not require an additional calculation step. Alternatively, the seed key can also be calculated based on the removed data portion 220, e.g. using an optimization method to evaluate noise in the removed portion 220. Such a seed key can then be defined, which results in replacement portion 230 being as close as possible to removed portion 220. Further, the seed key can also be defined based on the noise characteristic of acquisition device 10, in such a way that replacement portion 230 generated therefrom is as close as possible to removed portion 220. For this purpose, the seed key can also be determined empirically or in model-based fashion, if necessary.

Remaining portion 240 can then be compressed, in particular losslessly compressed, and replacement information 23 can be transmitted to receiver 30 together with the compressed remaining portion 240.

After transmission 130, a decompression 150 of remaining portion 240 can first take place in order to obtain decompressed data 212. Subsequently, using the transmitted replacement information 231, pseudo-noise 230 can be reimpressed on remaining portion 240, for example through the following calculation of the pixel values $$z_i = \text{round}\left([y_i - R_i] \cdot \frac{\sigma_0}{q}\right).$$

A noise model and its parameters are used here, the noise model being the functional form of the transformation and the parameters being the exact values for $\sigma_0$ and q. The pseudo-random number $R_i$ can be calculated by generator 20, which receives the transmitted replacement information 231 for the random number generation for this purpose. Data 210 obtained in this manner, with the pixel values $z_i$, are very close to the original ascertained data 210 and can subsequently be transmitted to another device 60 for further processing 170.

The above explanation of the specific embodiments describes the present invention by way of example only. Of course, individual features of the embodiments can be freely combined with each other, if this makes sense technically, without departing from the scope of the present invention.

What is claimed is:

1. A method for a provision of image recordings in a vehicle, the method comprising the following steps carried out in automated fashion:
    ascertaining a first image recording of a first image sensor of the vehicle, and at least one further image recording of at least one further image sensor of the vehicle, different spatial environmental regions of an environment of the vehicle being imaged by the first and further image recordings, to provide at least one item of information relevant for a vehicle function of the vehicle;
    carrying out a merging of the first image recording and the at least one further image recording for a reduction of an amount of data for providing the relevant information, the merging taking place based on a selection from the environmental regions, to obtain at least one merged image recording; and initiating at least one transmission of the merged image recording within the vehicle and at least to a central control device of the vehicle, whereby the merged image recording is supplied to a processing for performing the vehicle function.

2. The method as recited in claim 1, wherein, for the selection from the environmental regions, the following step is carried out:

removing at least one region of the first and further image recordings that redundantly images a portion of the environment and/or an overlapping region of the environment.

3. The method as recited in claim 1, wherein, for the selection from the environmental regions, the following step is carried out:

removing at least one region of the first and further image recordings that is not part of the relevant information.

4. The method as recited in claim 1, wherein the selection from the surrounding regions is carried out based on at least one item of position information about a position and/or orientation of the first and further image sensors on the vehicle, the position information being ascertained by performing at least one of the following steps:

evaluating at least one predefined item of information about the position of the first and further image sensors on the vehicle, carrying out a calibration of the position information by a trained algorithm.

5. The method as recited in claim 1, wherein the carrying out of the merging includes selecting at least one region of interest of the first and further image recordings, the region of interest being defined by the vehicle function, regions of the first and further image recordings outside the region of interest being excluded from the merging and/or the transmission.

6. The method as recited in claim 5, wherein an item of selection information is defined and transmitted by the central control device based on at least one reference marker, and is received by a zone controller, in order to carry out the merging as a function of the selection information to adjust the region of interest.

7. The method as recited in claim 1, wherein the carrying out of the merging includes the following step:

incorporating into the merged image recording an item of metadata information defining at least one region of the first and further image recordings that is excluded from a transmission.

8. The method as recited in claim 1, wherein the at least one item of information relevant for the vehicle function of the vehicle includes an acquisition value, and the carrying out of the merging includes the following steps:

evaluating at least one acquisition region of the first and further image recordings to determine therefrom the acquisition value, the acquisition value including a speed of the vehicle, the acquisition region being different from a region of interest;

incorporating an item of additional information that includes the acquisition value into the merged image recording; and excluding the acquisition region from the merged image recording and/or the transmission.

9. The method as recited in claim 1, wherein the carrying out of the merging is accomplished in decentralized fashion by a zone controller, the first and further image recordings being transmitted to the zone controller after the ascertaining of the first and further image recordings, the transmission of the merged image recording to the central control device being carried out via a transmission system including a bus system of the vehicle.

10. The method as recited in claim 1, wherein a lossy data compression of a respective image recording of the image first and further image recordings and/or the merged image recording is carried out, the lossy data compression including the following steps:

carrying out a preparation of the respective image recording, in which a portion of the respective image recording is removed and an artificially generated and reproducible replacement portion is defined, as an approximation of the removed portion, by an item of replacement information, in order to prepare the respective image recording for a lossless data compression;

carrying out the lossless data compression of the prepared image recording, the replacement information being transmitted instead of the removed portion during a respective transmission of the respective image recording.

11. The method as recited in claim 10, wherein the carrying out of the preparation includes at least one of the following steps:

incorporating at least one item of additional information including an acquisition value, into the respective image recording, incorporating metadata information into the respective image recording, incorporating at least one reference point, which is configured to determine a position of the first and further image sensors and/or the positions of the first and further image sensors relative to one another.

12. A non-transitory computer-readable medium on which is stored a computer program including instructions for a provision of image recordings in a vehicle, the instructions, when executed by a computer, causing the computer to perform the following steps carried out in automated fashion:

ascertaining a first image recording of a first image sensor of the vehicle, and at least one further image recording of at least one further image sensor of the vehicle, different spatial environmental regions of an environment of the vehicle being imaged by the first and further image recordings, to provide at least one item of information relevant for a vehicle function of the vehicle;

carrying out a merging of the first image recording and the at least one further image recording for a reduction of an amount of data for providing the relevant information, the merging taking place based on a selection from the environmental regions, to obtain at least one merged image recording; and initiating at least one transmission of the merged image recording within the vehicle and at least to a central control device of the vehicle, whereby the merged image recording is supplied to a processing for performing the vehicle function.

13. A device for data processing, configured to provide image recordings in a vehicle, the device configured to, in automated fashion:

ascertain a first image recording of a first image sensor of the vehicle, and at least one further image recording of at least one further image sensor of the vehicle, different spatial environmental regions of an environment of the vehicle being imaged by the first and further image recordings, to provide at least one item of information relevant for a vehicle function of the vehicle;

carry out a merging of the first image recording and the at least one further image recording for a reduction of an amount of data for providing the relevant information, the merging taking place based on a selection from the environmental regions, to obtain at least one merged image recording; and initiate at least one transmission of the merged image recording within the vehicle and at least to a central control device of the vehicle, whereby the merged image recording is supplied to a processing for performing the vehicle function.

\* \* \* \* \*